Figure 1:
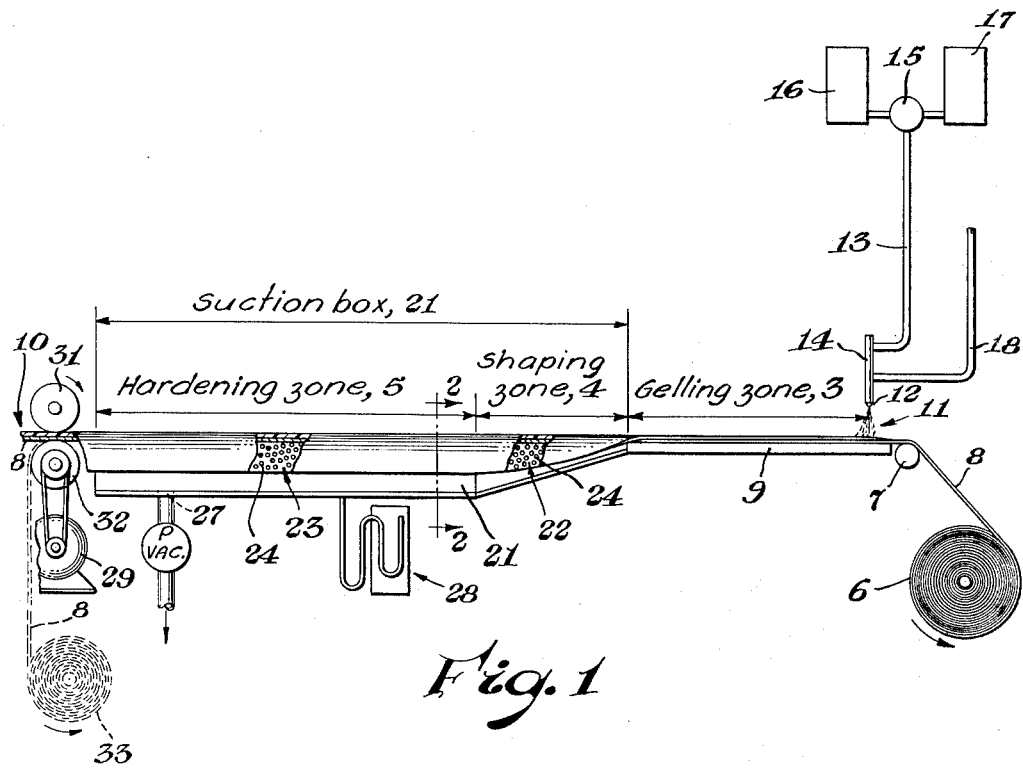

Dec. 28, 1965     H. S. SMITH, JR     3,226,457
METHOD AND APPARATUS FOR CONTINUOUSLY
FORMING PLASTIC ARTICLES
Filed March 23, 1961

INVENTOR.
Hubert S. Smith, Jr.
BY
William R. Norris
ATTORNEY 3,226,457
METHOD AND APPARATUS FOR CONTINUOUSLY FORMING PLASTIC ARTICLES
Hubert S. Smith, Jr., Essexville, Mich., assignor to The Dow Chemical Company, Midland, Mich., a corporation of Delaware
Filed Mar. 23, 1961, Ser. No. 97,915
7 Claims. (Cl. 264—90)

The present invention relates to a method and apparatus for manufacturing shaped articles of solid plastics and solid, plastic foams. More particularly, the invention relates to a continuous method for preparing lineal, open-shaped articles such as, for example, hemi-cylindrical pipe covering sections, open ducts, corrugated shapes and the like.

The word "lineal," as used herein, means constituted in the longitudinal direction of parallel, straight lines. The terminology "open shaped" refers to a transverse cross-section or profile of the linear article. The profile is "open" in the sense that there is no enclosure and "shaped" in the sense that it presents one or a plurality of arcs, bent shapes, or the like non-linear shapes.

Heretofore such shaped, articles have been produced by extruding, molding or cutting techniques. The latter technique is particularly undesirable since large amounts of waste result from cutting or otherwise shaping regular stock such as log foam stock into open profiled shapes. Any molding operation must, of necessity, be intermittent and involve cumbersome mold forms when large articles are produced. Extrusion techniques, which are ordinarily convenient means for producing lineal, open-shaped articles cannot be effectively employed with many plastic forming resin systems. This is especially true of resin systems requiring at least a few seconds for the completion of the plastic-forming reaction, and possibly more time for the plastic to gel and set in its final shape. Such resin systems, which can be employed to prepare a solid plastic or solid plastic foam in situ, are of particular interest in the practice of the present invention.

Correspondingly, it is an object of the present invention to provide novel, improved methods and apparatus for forming lineal, open-shaped, articles of plastic-forming resins. A still further object is to provide an improved method and apparatus for continuously preparing such articles. These and other objects and benefits will become manifest as the invention is hereinafter described in the following specification in conjunction with the accompanying drawings.

The above objects and others are accomplished in accordance with the present invention by carrying out the following procedure. Initially, a layer of a liquid, in situ plastic-forming resin is deposited on the upper surface of a moving, flexible, essentially flat carrier strip. The resulting plastic-carrier combination is maintained in an essentially planar form at least until the plastic layer has achieved a gel stage of cure. The gelled plastic-carrier combination is then passed lineally over a perforated rigid, final shape form which constitutes the top, or is an integral portion of the top, of an enclosed suction box. Said final shape form has a constant profile-forming surface longitudinally defined by parallel straight line elements and is adapted to slidably engage the undersurface of the carrier strip. But for the perforations in the final shape form portion of its upper surface communicating to its interior, said suction box is an otherwise air tight chamber connected to evacuating means. While the plastic-carrier combination is being passed over the above-described final shape form, a gas pressure differential is applied across the plastic-carrier combination and perforated final shape form by partially evacuating the enclosed suction box whereby the moving plastic-carrier combination is caused to conform to the contour or shape of the perforated, constant profile, forming surface of the final shape form. The plastic-carrier combination is maintained on the final shape form in this manner until the plastic is sufficiently cured or hardened to provide a lineal, open-shaped, solid article.

A preferred embodiment of the present invention utilizes, in addition to the final shape form, a perforated, rigid, transition shape form which, like the final shape form, is also integrally positioned in the upper surface of a suction box with the perforations communicating to the interior of the box. The transition shape form has a forming surface which is shaped so as to aid or facilitate in conjunction with an air pressure differential, the gradual shaping or swaging of the essentially planar gelled plastic-carrier combination, as received from the flat support means, into the shape of the constant profile, forming surface of the final shape form. The transition and final shape forms are constructed in such a manner and cooperatively joined together so as to provide a continuous, perforated, forming surface having one or more subjacent suction box chambers.

On passing over the shaping forms as described above, the plastic-carrier combination is caused to conform to the shape of the forming surface of its perforated support by a pressure differential, usually air pressure, created by evacuating the suction box. As will be apparent to one skilled in the art, such an air pressure differential should not be so great as to cause excessive frictional drag nor should it be so small as to permit easy separation of the carrier strip from the forming surface. If desired, the suction box may be partitioned to provide several chambers subjacent to either or both the transition and final shape forms, which chambers may be individually connected to separate evacuating means. Such an arrangement may be desirable in order to permit better localized control of the pressure differential.

In addition to such considerations as the individual strength characteristics of the materials being employed and the amount of materials or weight involved, the air pressure differential which is optimum for a particular system will depend in part on the number, size and distribution of perforations, or holes communicating with the interior of the suction box, in the shaping form. Suitable perforations may range in size from as little as about 0.01 to as much as about 0.75 inch in diameter, depending upon the stiffness of the plastic-carrier combination. In fact, it may be desirable in some instances to vary the diameter of the perforations throughout the length of the shaping forms, providing larger diameters as greater forces are required to maintain the plastic-carrier combination in the shape of the forming surface. A sufficient number of perforations are provided throughout the entire shaping form to achieve the desired conformation of the plastic-carrier combination to the forming surface. Essentially, under given conditions, the air pressure differential employed must be sufficient to cause the undersurface of the plastic-coated carrier strip to conform to and slidably engage the upper forming surface of the perforated shaping form. Generally, relatively small vacuums from about 2 to 6, preferably about 4 inches of water, are sufficient for the purposes of the invention.

The plastic-carrier combination is maintained on the final shape form until a final or hardened stage of cure is achieved which is sufficient to insure that the given shape is retained, i.e., that the resulting solid plastic product exhibits recovery properties when subjected to stress.

Upon discharge from the final shape form, the solid plastic articles, the carrier strip remaining bound thereto, may be transversely cut into desired lengths. Other doctoring operations that may be desirable include trimming edges or cutting the plastic stock longitudinally to provide flat edged or otherwise uniform profiled objects.

In an optional embodiment of the foregoing process, the carrier strip is separated or stripped from the plastic article upon its discharge from the final shape form. This procedure, of course, affords the possibility of recovering and storing such carrier materials for the later reuse or directly recycling them to the feed end of the process apparatus. In the latter instance, the carrier strip functions in the manner of a conveyor which may be power driven.

Depending upon the mode of operation employed, the supply of carrier strip may be in any convenient form. In an instance in which the carrier strip is not recycled, a roll of the carrier strip conveniently permits continuous feed to the process. The carrier strip material can be any flexible or pliant plastic film, paper, cloth, web or sufficiently flexible metal foil such as an aluminum foil or aluminum foil-paper laminate which is inert to the liquid, in situ plastic forming, reactant charge being utilized and has sufficient strength and flexibility for drawing through the apparatus and conforming to the shape of the forming surfaces. Its width should be at least sufficient to cover the particular perforated shaping forms employed. Normally, sufficiently flexible materials having a tensile strength of about 2 to 4 pounds or more per linear inch of width are satisfactory.

The in situ plastic-forming, resin systems employed in the present invention can be any of those known classes of resin systems which react, with or without the utilization of heat and/or catalysts to provide solid plastic or solid plastic foam products that may be either flexible or rigid in character. Foam-forming resin systems that may be employed include those which, alone or in combination with other materials, with or without a catalyst or gasifiable substance, with or without special blowing agents, form solid plastic foams possessing the capacity to retain a specific shape.

While, in the following examples, the method of the present invention is illustrated for the most part with respect to one type of plastic-forming resin system, namely, foaming polyurethanes, it is essentially applicable to and can be most advantageously adapted for forming solid plastic articles of urea-formaldehyde, phenolic resins, polyesters, epoxies and the like resins. Resin systems that may be employed to prepare solid plastic foams include phenolic resins, formable polystyrenes, foamable epoxy resins, foamable compositions of halomethylated diaromatic ethers such as are disclosed in U.S. Patent 2,911,380 and the like solid foam-forming resin systems.

The polyurethane foams are prepared as a result of a reaction between a diisocyanate compound, a relatively high molecular weight polyhydroxy compound, e.g., having a hydroxyl number range from about 100 to about 1000, water and a suitable catalyst for the reaction. The diisocyanate compounds may be either aliphatic or aromatic diisocyanates but the aromatic, e.g., toluene diisocyanates, are preferred. Suitable polyhydroxy compounds include, for example, polyester condensation products of a polyhydroxy organic compound with a polybasic organic acid, preferably a dibasic acid, or polyether condensation products of a glycol with ethylene oxide, propylene oxide, butylene oxide, or the like.

While acid catalysts can be employed in certain instances, the urethane reaction is generally base catalyzed. Among the better catalysts are tertiary amines having a strong base strength and little steric effect on the reaction. Examples of such catalysts are dimethylhexahydroaniline, diethylhexahydroaniline, dimethylethanolamine, triethylenediamine and the like.

The carbon dioxide producing side reaction between water and unreacted isocyanate radicals during the polymerization reaction provides a convenient source of a blowing agent. This reaction, however, may be reinforced or totally replaced with an inert, gaseous blowing agent such as a perhalogenated methane or ethane. Such blowing agents are usually dissolved under pressure in one or more of the reacting ingredients prior to the final mixing thereof in the polymerization or resin-forming and foaming steps.

It is also generally desirable to employ an emulsifier for the reaction system in addition to the foregoing reactants. The emulsifier must be substantially non-ionic. A preferred class of emulsifiers is constituted by the group of materials comprising polyoxyalkylene glycols and dimethylpolysiloxanes.

Foam density, which depends upon the particular reactants and the amount of blowing agent employed can range anywhere from about 0.4 to 25 pounds per cubic foot, but a preferred range is from about 0.9 to about 2 pounds per cubic foot. Either closed cell or open cell foam structures can be prepared.

Generally, the polyurethane based foams cure at normal room temperatures, but if desired, their cure can be accelerated by the application of heat at temperatures up to as much as 300° C. by such means as hot gases, infrared heating sources and the like.

The viscosity of the deposited charge of reactants at the point of application on the moving flat carrier strip should be controlled within broad limits. Viscosities that are too high will result in an uneven surface due to the fact that the foaming charge gels before having sufficient opportunity to seek a uniform level. Viscosities that are too low, on the other hand, will not permit the building up of a desired foam thickness without excessive running. This variable may be controlled in one or more ways such as by selecting reactants of a suitable molecular size and structure, by preheating a portion of the reactants to partially react them prior to their deposition on the carrier strip, by the addition of thixotropic agents or by the use of low viscosity blowing agents soluble in at least one of the reactants.

Figure 2:
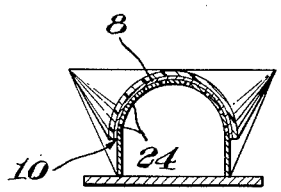
Figure 3:
Figure 4:
Figure 5:

In the drawings, FIGURE 1 is a schematic elevational view of an apparatus suitable for the practice, and illustrating the method, of the present invention. FIGURE 2, taken along line 2—2 of FIGURE 1, is a sectional view of the suction box having a constant profile forming surface with a foamed article thereon. FIGURE 3, 4 and 5 illustrate other constant profile forming surfaces.

In FIGURE 1 of the drawings, there is shown a cooperative arrangement of mechanical components suitable for carrying out the invention. These components may be aligned within and joined by any suitable connecting means to any convenient supporting framework, whether it be of integral construction or comprise independent components.

Beginning at the feed end of the apparatus, there is a carrier strip supply roll 6 and a carrier strip feed roll 7 adapted to guide the carrier strip 8 onto a flat support means. Such support means may be, as illustrated, simply a flat support table 9. Other suitable support means include moving conveyors or any equivalent mechanical support means which presents an essentially flat upper surface adapted to support the carrier strip in an essentially planar shape. The support means also must have a sufficient width and length to support the moving carrier strip as it passes through the gelling zone 3. In the gelling zone 3, a liquid, in situ, plastic-forming charge is deposited on the upper surface of the moving carrier strip 8. Subsequently, the plastic-carrier combination 10 is maintained in an essentially planar shape at least until the layer of plastic-forming charge has achieved a gel stage of cure. Preferably, the flat support means is maintained in an essentially horizontal position but, if desired, it may be inclined with respect to either linear or transverse axis of the apparatus so long as the angle of inclination is not sufficient to cause the deposited liquid, plastic-forming charge to flow excessively or run off the carrier strip 8.

Positioned above the flat support table 9 is an applicating means for depositing the plastic-forming charge. Means that can be employed for this purpose include those which are operated by gravity or an auxiliary pressure system and which are modified or designed to accommodate the particular plastic-forming charge employed and deposit it uniformly on the upper surface of a moving carrier strip. Specific types of apparatus which accomplish this function include gravity operated dispensers, a series of fixed, adjacent spray nozzles, froth dispensers or, as is illustrated in the accompanying drawing, a single spray nozzle 12 adapted to pass reciprocally across the width of the moving carrier strip 8.

In the drawing, the spray nozzle 12 and spraying head 14 assembly is attached by means of a feed line 13 to a plastic-forming charge mixing head 15. This head is connected to supply apparatus suitable for containing the necessary components of a plastic-forming charge. In the instance of a foamable polyurethane resin, such apparatus comprises a prepolymer tank 16 and a cross-linker tank 17. From each of these, a component is fed to the mixing head 15 which meters and thoroughly mixes them to provide a desired liquid foaming charge 11. Also connected to the spraying head 14 is an auxiliary pressure line 18.

Continuing from feed to discharge (illustrated as from right to left), the next adjacent mechanical component of the apparatus is the enclosed suction box 21. This section of the apparatus comprises an upper surface or top constituted of a transition shape form 22 corresponding in length to the transition shaping zone 4 and a continuous final shape form 23 corresponding in length to the hardening zone 5.

Both the transition shape form 22 and the final shape form 23 have perforations 24 positioned over their entire surface communicating to the interior of the suction box 21. The suction box 21 also has a port 27 for evacuating gases but is otherwise enclosed so as to form an air-tight chamber. If desired, for the purposes of control, the chamber within the suction box 21 may be connected to a manometer 28. The essentially planar, plastic-carrier combination (illustrated as a foam-carrier combination 10) passes from the flat support table 9 onto the transition shape form 22 after the foam has gelled but is still in a formable stage of cure. As the combination passes over this surface, the still formable, foam-carrier combination 10 is shaped or swaged with the aid of gravity and/or an applied conforming gas pressure differential into the shape of the constant profile forming surface of the final shape form 23. The forming surface of the transition shape form 22 is adapted so as to achieve a gradual transition throughout its length from an essentially flat surface into the constant profile forming surface of the final shape form 23.

The forming surface of the final shape form 23 is generated with parallel straight lines which, in a transverse cross-section, define an open-shaped profile such as, for example, those forming surface profiles illustrated in FIGURES 2, 3, 4 and 5. The foam-carrier combination 10 is caused to conform to and be maintained in the shape of the constant profile of the final shape form 23 with an applied conforming gas pressure differential until a solid article comprising a substantially cured, solid plastic foam is obtained.

From the final shape form 23 the hardened or substantially cured foam-carrier combination 10 illustrated passes into take-away rolls 31 and 32, the latter being driven with a motor 29. Subsequent operations may include doctoring e.g., trimming, the edges of the foamed article and cutting it into desired lengths.

In FIGURE 1, the foam-carrier combination 10 is depicted with solid lines as being withdrawn from the final shape form 23 as a unitary, continuous open-shaped, foamed article.

A modification of the foregoing procedure which, in some instances, may be highly desirable, involves separating or stripping the carrier strip 8 from the shaped article (as shown with dotted lines). The carrier strip 8 may be recovered on a carrier strip receiving roll 33 (shown with dotted lines or recycled to the carrier strip feed roll 7. In the latter instance, the carrier strip 8 functions as a conveyor which may be driven at any convenient bearing surface with powered rolls.

The transition shape form 22 while being present in a preferred embodiment of the suction box, is optional since its particular function in the apparatus can be supplanted with any convenient equivalent mechanical support means or omitted entirely. In the latter instance, a gelled plastic-carrier combination may pass directly from the flat support means onto the final shape form.

Each of the basic mechanical components, flat support means, transition shape form (if one should be employed) and final shape form, which components are correlated respectively with the gelling, shaping and hardening zones, are adapted with regard to their length so as to accommodate the particular curing characteristics of the plastic resin being used and the travel rate of the plastic-carrier combination through the apparatus. The length of the flat support means from the point of disposition of the plastic-forming resin charge forward in the feed direction of the apparatus is at least sufficient to permit the deposited plastic charge to achieve a gel, e.g., shape retaining, stage of cure. The maximum linear distance of the transition shape form with regard to a particular travel rate is determined by the period of time during which the moving, gelled plastic-carrier combination is still formable, i.e., capable of taking a permanent shape upon the application of moderate molding pressures. The transition shape form may, of course, be shorter so that the plastic-carrier combination is still formable while passing over an initial portion of the final shape form. The final shape form is sufficiently long to provide continuous support for the plastic-carrier combination passing thereover until the plastic coating becomes substantially cured.

In a representative operation, an apparatus similar to that shown in FIGURE 1 was employed to prepare a half section of foamed polyurethane insulation for a nominal 6 inch pipe. The particular apparatus employed consisted of an integral, lineal arrangement of a carrier strip feed roll adapted to supply a moving carrier strip to an essentially horizontal flat support table. Positioned at about 6 inches above the flat support table was a nozzle assembly attached to reciprocating means capable of traversing the width of the carrier strip at a variable rate from 10 to 80 cycles per minute. Adjacent to the flat support table and extending longitudinally therefrom was a suction box having a top constituted of a series arrangement of a 44 inch transition shape form and a 120 inch final shape form. The latter had a constant profile in the shape of a half circle having a 3.4 inch radius.

While it is possible to design equipment or to arrange the individual components to provide any desired linear relationship, the particular apparatus employed in the present example provided linear distances of 9 inches, 44 inches and 120 inches for the gelling, shaping and hardening zone intervals, respectively. Specific time ranges permissible for accomplishing each of the above-mentioned stages were computed for assumed carrier strip feed rates on the basis of the foregoing linear relationships. The results of these computations are set forth in the following Table 1.

Table 1

|  | Assumed Carrier Strip Feed Rates | |
| --- | --- | --- |
|  | 1 ft./min. | 4.5 ft./min. |
| Gelling time, sec | 45 | 10 |
| Shaping time, sec | 220 | 49 |
| Hardening time, sec | 1,150 | 192 |

A series of in situ, foamable urethane formulations containing varying amounts of a catalyst were sprayed onto a flat piece of paper by means of GUSCO (A. Gusmer, Inc.) processing equipment. The gelling time or required time interval for achieving a shape-retaining cure of the above formulations was determined by vertically suspending a piece of the freshly sprayed paper and observing the time passing before the sprayed formulation ceased to run. The shaping time or time interval during which a gelled foaming charge is still formable, i.e., is capable of taking a permanent shape upon the application of moderate pressures, was empirically determined as the shortest time interval required for a gelled charge to achieve a sufficiently advanced stage of cure to enable separation of the paper from the foam by flexing the paper. The hardening time or the final cure phase is the time required for a foam formulation having passed through the formable stage, to become substantially cured or resilient, i.e., capable of recovering its original shape upon the application of deforming stress which is below the yield point of the cured material.

In the foregoing manner, it was determined by trial that a certain foaming charge made up of 124 parts of a prepolymer and 160 parts of a cross-linking mixture had a gelling time of 15 seconds, shaping time of 60 seconds and a hardening time of 180 seconds. By reference to the above table, it was ascertained that the foregoing formulation could be employed in the above-described apparatus at a carrier strip feed rate of about 3 to 4 feet per minute depending upon the desired foam thickness.

The prepolymer was prepared by reacting 25 parts of a polyglycol consisting of the addition product of 3 moles of propylene oxide and 1 mole of glycerol with 75 parts of toluene diisocyanate. The partial reaction product was obtained by heating the foregoing mixture at a temperature of about 70° C. for a period of time of about 180 minutes. The cross-linking mixture employed with the above prepolymer contained 121 parts of a multi-functional polypropylene glycol having a hydroxyl number of 460 and an equivalent weight of 121, 37 parts of trichloromonofluoromethane, 0.7 part of a polypropylene glycol having a molecular weight of about 4000 and 1.2 parts of triethylenediamine.

A 40 pound kraft paper strip 24 inches wide was passed at a feed rate of about 3 feet per minute onto the horizontal support where it was sprayed with a sufficient coating of the above polyurethane formulation on its upper surface to provide an ultimate, cured foam thickness of about 1 inch. The foam was applied by means of the single nozzle assembly traversing the width of the moving carrier strip at a rate of 60 cycles per minute. The foam-carrier combination passed over a transition shape form and onto the perforated constant profile forming surface of the final shape form. The foam-carrier combination was caused to conform to the shape of the perforated constant profile forming surface by evacuating the suction box to provide an air pressure differential measured as 4 inches of water. The foam hardened in the shape of the constant profile forming surface of the final shape form to provide a continuous half section of 1 inch thick insulation for a 6 inch pipe.

A procedure similar to that employed with the foregoing urethane foam systems in the present invention was applied to an "epoxy" resin formulation consisting of 100 parts of the diglycidyl ether of 4,4'-isopropylidene diphenol, 15 parts of trichloromonofluoromethane, 1 part of a cell control agent and 2.5 parts of boron trifluoride as a catalyst. Having thoroughly mixed the catalyst into the above formulation, the resulting composition was poured onto a flat piece of paper. Subsequently, in accordance with the criteria set forth in the foregoing example, it was determined that the formulation had a gel time of 35 seconds, a shaping time of 55 seconds and a hardening time of 210 seconds. From an initial liquid layer of about 0.25 inch thickness, the composition expanded to provide a cured foam product 0.75 inch thick. Such composition can be used in the formation of shaped articles by the method of this invention.

In still another operation, a urethane foam was formulated and deposited on a carrier material as a froth or partially foamed material. The prepolymer consisted of the partial reaction product of 87 parts of a polypropylene glycol having an equivalent weight of about 87 with 319 parts of toluene diisocyanate having incorporated therein 0.5 part of a polysiloxane emulsifier or cell control agent. The cross-linking composition consisted of 92 parts of a polypropylene glycol having an equivalent weight of about 95, 22 parts of trichloromonofluoromethane, 0.5 part of triethylenediamine and 0.6 part of a polypropylene glycol having a molecular weight of about 4000. The prepolymer and cross-linking compositions were mixed and into the resulting composition was incorporated 10 parts of dichlorodifluoromethane. This composition was then thoroughly mixed under pressure and released from the mixing chamber to the atmosphere whereupon the low boiling blowing agent vaporized to give a liquid froth which was poured onto a flat piece of paper.

The initially deposited layer of froth (0.50 inch thick) expanded to provide a cured foam 1.25 inches thick. In a manner according to the procedure outlined above, it was determined that the foam froth had a gel time of 6 seconds, a formable time of 37 seconds and a hardening time of 230 seconds. Such a composition dispensed as a froth can be utilized in the present invention to prepare shaped foamed articles.

It is obvious from the foregoing description of the present invention and the working examples that numerous modifications can be made in the procedure and apparatus as well as the formulations employed to prepare lineal, open-shaped articles of solid plastics and solid plastic foams without departing from the spirit and scope of the present invention.

What is claimed is:

1. A process for manufacturing lineal, open-shaped articles of solid plastics, which process comprises the steps of (1) depositing a layer of a liquid, in situ plastic-forming resin charge on the upper surface of a moving, flat, flexible carrier strip, (2) maintaining the plastic-carrier combination in an essentially planar shape until the plastic layer has achieved a gel stage of cure, (3) passing the gelled plastic-carrier combination lineally over a perforated, rigid final shape form lying in and integral with the top of an enclosed suction box, said final shape form having a transversely non-rectilinear constant profile-forming surface longitudinally defined by parallel straight line elements and adapted to slidably engage the under-surface of the carrier strip, the perforations in the final shape form communicating with the interior of the suction box which is connected to evacuating means, (4) applying a pressure differential across the plastic-carrier combination and perforated final shape form by reducing the pressure in the suction box whereby the moving plastic-carrier combination is caused to conform to the contour of the constant profile-forming surface of the final shape form, and (5) maintaining said pressure differential until the plastic layer is sufficiently cured to provide a lineal, open-shaped article of a solid plastic.

2. The process as in claim 1 wherein the in situ plastic forming resin charge is an in situ formable resin charge.

3. The process as in claim 2 wherein the in situ formable resin charge is a formable polyurethane resin.

4. The process as in claim 2 wherein the in situ formable resin charge is a formable epoxy resin.

5. A process for manufacturing lineal, open-shaped articles of solid plastics, which process comprises the steps of (1) depositing a layer of a liquid, in situ plastic forming resin charge on the upper surface of a moving, flat, flexible carrier strip, (2) maintaining the plastic-carrier combination in an essentially planar shape until the plastic layer has achieved a gel stage of cure, (3) passing the gelled plastic-carrier combination lineally seriatim over perforated rigid, transition and final shape forms lying in and integral with the top of an enclosed suction box, the transition shape form having a forming surface which is shaped so as to facilitate shaping of the essentially planar gelled, plastic-carrier combination as received from the flat support means into a desired open shape and the final shape form having a constant profile forming surface transversely defining the desired open shape longitudinally defined by parallel straight line elements, said forms being adapted to slidably engage the under-surface of the carrier strip and said perforations in the forms communicating with the interior of the suction box which is connected to evacuating means, (4) applying a pressure differential across the plastic-carrier combination and perforated, transition and final shape forms by reducing the pressure in the suction box whereby the moving, plastic-carrier combination is caused to conform to the contour of the constant profile-forming surface of the final shape form, and (5) maintaining said pressure differential until the plastic layer is sufficiently cured to provide a lineal, open-shaped article of a solid plastic.

6. An apparatus for manufacturing lineal, open-shaped articles of solid plastics which comprises a lineal arrangement of flat support means and adjacent thereto and extending longitudinally therefrom, a suction box having a top of which an integral portion is a rigid perforated final shape form having a transversely non-rectilinear constant profile-forming surface defined longitudinally by parallel straight line elements, said perforations communicating to the interior of the suction box which is connected to evacuating means; means for supplying a flexible carrier strip over the top of the flat support means and onto and lineally over the constant profile-forming surface of the perforated final shape form; and applicating means positioned operatively above the flat support means and being adapted to deposit a layer of a liquid, in situ plastic forming, resin charge uniformly on the carrier strip.

7. An apparatus for manufacturing lineal, open-shaped articles of solid plastics, which comprises a lineal arrangement of flat support means and adjacent thereto and extending longitudinally therefrom a suction box having a top of which an integral portion is an operative arrangement, extending consecutively from the flat support means, of a rigid, perforated transition shape form and a rigid, perforated final shape form, the transition shape form having a forming surface adapted from an essentially rectilinear shape at the end adjacent to the flat support means to a desired open shape form at the opposite end, the final shape form having a constant profile forming surface transversely defining the desired open shape longitudinally defined by parallel straight line elements, said perforations communicating to the interior of the suction box which is connected to evacuating means; means for supplying a flexible carrier strip over the top of the flat support means and onto and lineally seriatim over the forming surfaces of the transition shape form and the final shape form; and applicating means positioned operatively above the flat support means and being adapted to deposit a layer of a liquid, in situ plastic forming resin charge uniformly on the carrier strip.

References Cited by the Examiner

UNITED STATES PATENTS

| | | | |
|---|---|---|---|
| 1,622,340 | 3/1927 | Paeplow | 18 |
| 2,345,013 | 3/1944 | Soday | 18—57 |
| 2,386,535 | 10/1945 | Beinhoff | 18—19 |
| 2,620,513 | 12/1952 | Cryor et al. | 18—45 |
| 2,746,749 | 5/1956 | Huck | 18 |
| 2,759,475 | 8/1956 | Van Swaay | 18—55 |
| 2,915,427 | 12/1959 | Schriner et al. | 18 |
| 2,921,346 | 1/1960 | Fischer | 18—57 |
| 2,952,037 | 9/1960 | Ruck et al. | 18—19 |
| 3,006,031 | 10/1961 | Friedman | 18—19 |
| 3,026,231 | 3/1962 | Chavannes | 264—92 |

FOREIGN PATENTS 582,122  8/1959  Canada.

ROBERT F. WHITE, *Primary Examiner.*

MICHAEL V. BRINDISI, ALEXANDER H. BRODMERKEL, *Examiners.*